US006444302B1

(12) United States Patent
Srinivas et al.

(10) Patent No.: US 6,444,302 B1
(45) Date of Patent: Sep. 3, 2002

(54) BREATHABLE FILMS AND METHOD FOR MAKING

(75) Inventors: Srivatsan Watson Srinivas, Houston; Patrick Brant, Seabrook, both of TX (US); Francois Henri Chambon, Teroureu (BE); James Peter Stokes, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 56 days.

(21) Appl. No.: 09/653,439

(22) Filed: Sep. 1, 2000

Related U.S. Application Data

(60) Provisional application No. 60/151,970, filed on Sep. 1, 1999.

(51) Int. Cl.[7] ........................ B32B 03/26; C08L 23/04; C08L 23/10

(52) U.S. Cl. ................................ 428/315.5; 428/304.5; 428/910; 428/523; 525/240; 525/241; 264/288.8; 264/290.2

(58) Field of Search ............................ 428/910, 315.5, 428/304.5, 523; 525/240, 241; 264/288.8, 290.2

(56) References Cited

U.S. PATENT DOCUMENTS 3,801,404 A 4/1974 Druin et al.
3,843,761 A 10/1974 Bierenbaum et al.
4,138,459 A 2/1979 Brazinsky et al.
4,379,102 A 4/1983 Kertscher
4,464,439 A * 8/1984 Castelein ............... 156/244.11
4,542,199 A 9/1985 Kaminsky et al.
4,559,938 A 12/1985 Metcalfe
4,620,956 A 11/1986 Hamer
4,725,473 A 2/1988 Van Gompel et al.
4,747,895 A 5/1988 Wallerstein et al.
4,752,597 A 6/1988 Turner
4,804,472 A 2/1989 Handlin, Jr.
4,818,600 A 4/1989 Braunt et al.
4,835,218 A * 5/1989 Yoshimura et al. ......... 525/221
4,842,187 A * 6/1989 Janocha et al. .......... 206/524.1
4,871,705 A 10/1989 Hoel
4,874,568 A * 10/1989 Chau et al. ................ 264/126
5,008,204 A 4/1991 Stehling
5,017,714 A 5/1991 Welbron, Jr.
5,026,798 A 6/1991 Canich
5,055,438 A 10/1991 Canich
5,057,475 A 10/1991 Canich et al.
5,084,334 A 1/1992 Hamano et al.
5,096,867 A 3/1992 Canich
5,120,867 A 6/1992 Welbron, Jr.
5,134,173 A 7/1992 Joesten et al.
5,153,157 A 10/1992 Hlatky et al.
5,169,706 A * 12/1992 Collier et al. ............... 428/152
5,198,401 A 3/1993 Turner et al.
5,238,735 A 8/1993 Nagou et al.
5,240,894 A 8/1993 Burkhardt et al.
5,243,001 A 9/1993 Winter et al.
5,264,405 A 11/1993 Canich
5,278,119 A 1/1994 Turner et al.
5,278,264 A 1/1994 Spaleck et al.
5,281,679 A 1/1994 Jejelowo et al.
5,296,434 A 3/1994 Karl et al.
5,304,614 A 4/1994 Winter et al.
5,312,262 A 5/1994 Bublitz
5,324,800 A 6/1994 Welborn, Jr. et al.
5,387,568 A 2/1995 Ewen et al.
5,391,629 A 2/1995 Turner et al.
5,420,217 A 5/1995 Canich
5,422,175 A 6/1995 Ito et al.
5,445,862 A * 8/1995 Kaneko et al. .......... 264/235.8
5,504,169 A 4/1996 Canich
5,547,675 A 8/1996 Canich
5,621,126 A 4/1997 Canich et al.
5,635,573 A 6/1997 Harrington et al.
5,643,847 A 7/1997 Walzer, Jr.
5,756,577 A * 5/1998 Gutierrez-Villarreal .... 428/35.1
5,763,556 A 6/1998 Shaffer et al.
5,767,208 A 6/1998 Turner et al.
5,801,113 A 9/1998 Jejelowo et al.
5,837,787 A 11/1998 Harrington
5,851,945 A 12/1998 Turner et al.
5,866,246 A 2/1999 Schreck et al.
5,885,704 A 3/1999 Peiffer et al.
5,914,184 A * 6/1999 Morman .................. 428/315.9
6,143,682 A * 11/2000 Fisher ........................ 502/103
6,194,341 B1 * 2/2001 Canich et al. .............. 502/113

FOREIGN PATENT DOCUMENTS

EP 0 141 592 A 5/1985
EP 0 096 458 B1 12/1986
EP 277004 8/1988
EP 0 141 592 B 6/1990
WO WO 92/00333 1/1992
WO WO 93/03093 2/1993
WO WO 94/03506 2/1994
WO WO 98/41572 9/1998
WO WO 99/07788 2/1999
WO WO 99/67095 12/1999

OTHER PUBLICATIONS

"Principles of Polymer Systems", Rodriguez 2d ed., *McGraw Hill Chemical Engineering Series*, p. 38, Table 3–1.

Polymer Blends, Dr. R. Paul, S. Newman, *Academic Press New York*, (1978) (BOOK).

*Polymer Engineering and Science*, S. Wu, vol. 27, p. 335 (1987).

(List continued on next page.)

*Primary Examiner*—D. Lawrence Tarazano
(74) *Attorney, Agent, or Firm*—Frank E. Reid; Charles E. Runyan, Jr.

(57) ABSTRACT

The present invention relates to a cold-drawn breathable film formed from a blend of a soft polymer component and a hard polymer component. The soft polymer component (SPC) is a copolymer of a major olefinic monomer and a minor olefinic monomer. The major olefinic monomer is either ethylene or propylene and forms the majority of the SPC. Preferred films after cold-drawing exhibit a water vapor transmission rate (WVTR) of at least 100 g-mil/$m^2$-day.

28 Claims, No Drawings

OTHER PUBLICATIONS

"Liquid Chromotography of Polymers and Related Materials III", J. Cazes editor, Marcel Dekker, 1981, p. 207.

Wheeler and Willis, "Applied Spectroscopy", 1993, vol. 47, pp. 1128–1130.

PDL Permeability and Other Film Properties of Plastics and Elastomers, PDL Handbook Series, 1995 (BOOK).

*Journal of Polymer Science*, Wild et al., Polymer Physics Editions, vol. 20, p. 441 (1982).

*Accounts of Chemical Research* 8, E. Helfand, 295 (1975).

*Journal Chem. Phys.* 62(4), E. Helfand and A.M. Sapse, 1327 (1975).

Database WPI, Section Ch, Week 199518, Derwent Publications, Ltd., London, GB AN 1995–133540 XP 002155203 and JP 06 136167A (Nitto Denko Corp.) May 17, 1994 ABSTRACT.

"Preparation of Microporous Films From Immiscible Blends via Melt Processing" C. Chandavasu, et al. New Jersey Inst. Of *Tech—ANTEC 2000*, pp. 2458–2463.

"Vorticity Elongation in Polymeric Emulsions"—E.K. Hobbie, et al., *Phys. Rev. Letters*, (1999)—pp. 5393–5396.

* cited by examiner

BREATHABLE FILMS AND METHOD FOR MAKING

RELATED APPLICATIONS

This patent application claims priority to and fully incorporates by reference U.S. Ser. No. 60/151,970, filed Sep. 1, 1999.

FIELD OF INVENTION

The present invention relates to a method for producing breathable films from blends of synthetic polymers.

BACKGROUND OF THE INVENTION

Multi-layer films have been traditionally used to provide semi-permeable or selectively permeable properties in applications where breathability is desired. By breathable, it is meant that the film will allow transmission of water vapor and oxygen but not micro-organisms or bulk solids or liquids. Such properties are useful in a variety of applications, including fresh produce and flower packaging, disposable personal garments, house wrap, and membranes for various separation processes. Breathable films are especially useful for fabrication of clothing items where it is important to protect the wearer from environmental exposure or to prevent the escape of human waste while allowing the wearer greater comfort than permitted by an impermeable material. Examples of such products include, but are not limited to, surgical and health care related products, disposable work wear, and personal care absorbent products. Surgical and health care related products include surgical drapes and gowns, and the like. Disposable work wear includes coveralls and lab coats, and the like. Personal care absorbent products include diapers, training pants, incontinence garments, sanitary napkins, bandages, and the like.

Primary functions of such breathable films are to provide liquid barrier properties and/or block the passage of microorganisms, yet allow the transmission of moisture, air, other gases, or combinations thereof Apparel made from breathable and/or microporous films are more comfortable to wear by reducing the moisture vapor concentration and the consequent skin hydration underneath the apparel item. However, the pore size in breathable films cannot be too large, especially in protective apparel and personal care applications, such as industrial or medical garments, diapers, etc., where liquid penetration presents a contamination risk. Moreover, films containing pores that are too large may allow passage of liquids and/or viruses and thereby reduce the effectiveness of the protective apparel.

The conventional process for obtaining a breathable microporous film for commodity markets has been to stretch a thermoplastic film typically containing inorganic fillers. Microvoids are created by separation at the interface between filler particles and the polymer matrix containing the filler, when the film is stretched or drawn. The film is usually heated prior to these drawing processes to optimize the malleability of the film during stretching. This drawing or stretching also orients the molecular structure within the film, which increases its strength and durability with respect to forces applied in the stretch direction. Stretching can be in the machine direction (MD), the transverse (cross-machine) direction (TD), or biaxially (both MD and TD). Uniaxial or otherwise unbalanced stretching typically results in unbalanced properties (e.g. films tend to split more easily upon applied forces transverse to the direction of a uniaxial stretch). Regardless of the selected drawing process, there are inherent difficulties in processing filled polymers.

First, uniform dispersion of a filler, such as calcium carbonate, in a polymer requires a separate compounding step and substantial mechanical work. Second, the higher melt temperatures sometimes required during compounding can cause discoloration of the polymer and sometimes even polymer degradation. Third, additional equipment is required in order to assure efficient vacuum stripping to remove water released from the filler during the compounding step. The vacuum vents can plug and this leads to water in the compounded product and ruins the cast film. Fourth, die drool and smoking can occur as it is increasingly difficult to process filled polymer as the filler particle size decreases, especially below 2 microns. Consequently, the calcium carbonate must be screened to remove particles smaller than 2–3 microns. Smaller particles raise the viscosity of the compounded polymer so high that mechanical failures of the equipment are common. Finally, the calcium carbonate filled breathable films can have a gritty feel and tend to feel heavier since the $CaCO_3$ is more dense than the polymer matrix. Therefore, it would be highly desirable to have a method for producing breathable films that avoids the difficulties associated with hard filler substances, such as calcium carbonate.

Other methods to produce or enhance breathability include mechanical puncture of a film (see U.S. Pat. No. 4,747,895) or extraction of a co-continuous phase of a film formed from blended polymers (see U.S. Pat. No. 4,804,472). A third method uses a crystalline polymer or a mix of amorphous and crystalline polymers that create regular row-lamellar structures which result in uniform pores in the polymer when prepared and stretched under controlled conditions (see U.S. Pat. Nos. 3,843,761, 3,801,404, 4,138,459, and 4,620,956).

Multi-layer films, produced by either lamination or coextrusion of single-layer films have also been used to create breathable materials that are both impervious to liquids and have a durable cloth-like appearance and texture. The outer covers on disposable diapers are but one example. In this regard, reference may be had to U.S. Pat. Nos. 4,818,600 and 4,725,473. Surgical gowns and drapes are other examples. See, U.S. Pat. No. 4,379,102. U.S. Pat. No. 5,914,184 discloses a breathable multi-layer film laminate including microporous filled film bonded to continuous film. A support layer, such as a fibrous web, can be adhered to the film laminate on one or both surfaces. Lamination of multiple layers of film also requires additional processing steps and is therefore subject to more potential processing difficulties.

Typically, as in the above references, films are made breathable by the addition of fillers and subsequent stretching of the films and durability is improved through lamination of the film to other layers of film having properties lacking in the first layer. Using filler to produce breathable film and improving the toughness of a breathable film by lamination with other polymer layers are both time consuming and costly additional steps. There is therefore a need for films providing both breathability and durability without the need for either or both fillers and lamination of multiple layers.

SUMMARY OF THE INVENTION

The present invention relates to a cold-drawn film formed from a blend of a soft polymer component and a hard polymer component. The soft polymer component (SPC) is a copolymer of a major olefinic monomer and a minor olefinic monomer. The major olefinic monomer is either ethylene or propylene and forms the majority of the SPC. The minor olefinic monomer forms the remainder of the SPC and is a linear, branched, or ring-containing $C_2$ to $C_{30}$ olefin, capable of insertion polymerization, and is different from the major olefinic monomer.

In one embodiment, the SPC has a melting point greater than 25° C. and a flexural modulus at ambient temperature less than 100 Mpa, and the hard polymer component (HPC) has a flexural modulus at ambient temperature greater than 200 MPa.

In another embodiment, the SPC has a melting point greater than 25° C. and a secant modulus at ambient temperature less than 350 Mpa, and the hard polymer component (HPC) has a secant modulus at ambient temperature greater than 400 MPa.

The SPC and HPC can be blended as co-continuous phases, but preferably the HPC is a dispersed phase in a continuous phase of the SPC.

An initial film formed from a blend of the SPC and HPC is cold drawn at a temperature below the highest transition temperature, either melting or glass transition, of the HPC. Preferably, the drawing temperature is also higher than the temperature at which the first crystalline melting can be detected and lower than the maximum temperature at which the final crystalline melting can be detected in the SPC. The cold drawing is uniaxial or biaxial with a draw-down sufficient to produce a breathable film having a thickness less than that of the film prior to cold drawing.

In one embodiment, the tensile modulus of the film after cold-drawing is preferably less than or equal to 375 MPa. In another embodiment, the tensile modulus of the film after cold-drawing is preferably less than or equal to 160 MPa. Preferred films after cold-drawing exhibit a water vapor transmission rate (WVTR) greater than that of any blend component individually, preferably greater than 100 g-mil/$m^2$-day.

DETAILED DESCRIPTION OF THE PREFERRED EMBODIMENTS

The present invention is directed to a cold-drawn breathable film formed from a blend of a SPC and a HPC, both as defined above.

Soft Polymer Component

In one embodiment, the SPC is a single copolymer containing a major olefinic monomer and a minor olefinic monomer. The major olefinic monomer is ethylene or propylene and is designated as "major" because it is the primary constituent of the copolymer, preferably at least 80 mole percent of the SPC. The minor olefinic monomer is a linear, branched, or ring-containing $C_2$ to $C_{30}$ olefin, capable of insertion polymerization, or combinations thereof, and is not the same as the major olefinic monomer. The SPC is semi-crystalline and has a melting point greater than 25° C., preferably greater than 35° C., even more preferably greater than 50° C.

In one embodiment, a preferred semi-crystalline SPC according to this invention has a flexural modulus less than 100 MPa, more preferably less than 90 MPa, even more preferably less than 80 MPa.

In another embodiment, a preferred semi-crystalline SPC according to this invention has a secant modulus less than 350 MPa.

In one preferred embodiment, the major olefinic monomer is ethylene. In this embodiment where the SPC is a polyethylene copolymer, preferred minor olefinic monomers include linear, branched, or ring-containing $C_3$ to $C_{30}$ olefins, capable of insertion polymerization, or combinations thereof. Preferred minor olefinic monomers are $C_3$ to $C_{20}$ linear or branched α-olefins, more preferably $C_3$ to $C_8$ α-olefins, even more preferably propylene, 1-butene, 1-hexene, and 1-octene. Preferred branched α-olefins include 4-methyl-1-pentene, 3-methyl-1-pentene, and 3,5,5-trimethyl-1-hexene. Preferred ring-containing olefinic monomers contain up to 30 carbon atoms and include but are not limited to cyclopentene, vinylcyclohexane, vinylcyclohexene, norbornene, and methyl norbornene.

Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone.

Preferred aromatic-group-containing monomers contain at least one aromatic structure appended to a polymerizable olefinic moiety. The polymerizable olefinic moiety can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. Particularly preferred aromatic monomers include styrene, alpha-methylstyrene, vinyltoluenes, vinylnaphthalene, allyl benzene, and indene, especially styrene and allyl benzene.

In one embodiment, the polyethylene copolymer is a semicrystalline, thermoplastic preferably random copolymer, of ethylene and at least one α-olefin, most preferably $C_3$–$C_8$ linear or branched, has a melting point of 50° C. or more, more preferably 60° C. or more, even more preferably 65° C. or more, most preferably 70° C. or more. Preferably, the polyethylene copolymer has a melting point 125° C. or less, more preferably 120° C. or less.

Typically, the average ethylene content is 84 mole % or more, preferably 87 mole % or more, more preferably 89 mole % or more. Preferably, the average ethylene content is 99 mole % or less, more preferably 98 mole % or less. The balance of the copolymer is one or more minor olefinic monomers, capable of insertion polymerization, more preferably one or more α-olefins as specified above and optionally minor amounts of one or more diene monomers.

Density of the polyethylene copolymer, in g/cc, is preferably 0.865 or more, more preferably from 0.870 or more. Maximum density of the polyethylene in one embodiment is 0.930 or less. In yet another embodiment, maximum density of the polyethylene copolymer is 0.915 or less, more preferably from 0.865 to 0.900, even more preferably from 0.870 to 0.890.

Weight average molecular weight (Mw) of the polyethylene copolymer is typically 30,000 or more, preferably 50,000 or more, even more preferably 80,000 or more. $M_w$ of the polyethylene copolymer is typically 500,000 or less, more preferably 300,000 or less, even more preferably 200,000 or less.

Polyethylene homopolymers and copolymers are typically produced using Ziegler-Natta or metallocene catalyst systems. Particularly preferred polyethylene copolymers are produced with metallocene catalysts and display narrow molecular weight distribution, meaning that the ratio of the weight average molecular weight to the number average molecular weight will be equal to or below 4, most typically in the range of from 1.7 to 4.0, preferably from 1.8 to 2.8.

Preferably, polyethylene copolymers produced with metallocene catalysts will also display narrow composition distribution, meaning that the fractional comonomer content from molecule to molecule will be similar. This can be measured by Fourier Transform Infrared Spectroscopy analysis of discrete ranges of number or weight average molecular weights ($M_n$ or $M_w$) as identified with Gel Permeation Chromatograhy (GPC-FTIR), and in limited cases composition distribution breadth index or solubility distribution breadth index can also be used to measure comonomer distribution. A preferred polyethylene copolymer has a comonomer distribution when measured by GPC-FTIR such that the comonomer content of any discrete molecular weight range comprising 10 weight % or more of the total eluted copolymer is within ±30% of the weight average comonomer content of the polyethylene copolymer where this average equates to 100%, more preferably within ±20%, even more preferably within 10%. Where measurement by SDBI is applicable, the SDBI of the polyethylene copolymer is preferably less than about 35° C., generally in the range of about 10° to about 25° C., preferably in the range of about 15° to about 20° C., and most preferably in the range of about 15° to about 18° C. Where CDBI is applicable, the CDBI of the polyethylene copolymer is preferably greater than 40%, more preferably greater than 50%, even more preferably greater than 60%. The polyethylene copolymer has a narrow compositional distribution if it meets the GPC-FTIR, CDBI, or SDBI criteria as outlined above.

In a particularly preferred embodiment, the copolymer is a single-site catalyzed "polyethylene," preferably produced using metallocene catalysis. "Polyethylene," as used herein, means an SPC wherein ethylene is the major olefinic monomer. Such polyethylene materials are commercially available from ExxonMobil Chemical Company of Houston, Tex. under the trade name Exact™ or Exceed™ resins. These materials may be made in a variety of processes (including slurry, solution, high pressure and gas phase) employing metallocene catalysts. Processes for making a variety of polyethylene materials with metallocene catalyst systems are well known. See, for example, U.S. Pat. Nos. 5,017,714, 5,026,798, 5,055,438, 5,057,475, 5,096,867, 5,153,157, 5,198,401, 5,240,894, 5,264,405, 5,278,119, 5,281,679, 5,324,800, 5,391,629, 5,420,217, 5,504,169, 5,547,675, 5,621,126, 5,643,847, and 5,801,113, U.S. patent application Ser. Nos. 08/769,191, 08/877,390, 08/473,693, 08/798,412, and 60/048,965, and international patent application nos. EPA 277,004, WO 92/00333, and WO 94/03506, each fully incorporated herein by reference for purposes of U.S. patent practice. Production of copolymers of ethylene and cyclic olefins are described in U.S. Pat. Nos. 5,635,573 and 5,837,787, and of copolymers of ethylene and geminally di-substituted monomers, such as isobutylene, are described in U.S. Pat. No. 5,763,556, all of which are fully incorporated herein for purposes of U.S. patent practice.

In another preferred embodiment, the major olefinic monomer is propylene. In this embodiment, preferred minor olefinic monomers include ethylene and linear or branched $C_4$ to $C_{30}$ $\alpha$-olefin or combinations thereof. Preferred linear $\alpha$-olefins include ethylene or $C_4$ to $C_8$ $\alpha$-olefins, more preferably ethylene, 1-butene, 1-hexene, and 1-octene, even more preferably ethylene or 1-butene. Preferred branched $\alpha$-olefins include 4-methyl-1-pentene, 3-methyl-1-pentene, and 3,5,5-trimethyl-1-hexene.

The low levels of crystallinity in the polypropylene copolymer are derived from isotactic or syndiotactic polypropylene sequences, preferably isotactic polypropylene sequences, obtained by incorporating minor olefinic monomers as described above, as comonomers. Preferred polypropylene copolymers have an average propylene content on a molar basis of 49% or more, more preferably 59% or more, even more preferably 65% or more, even more preferably 72% or more, most preferably 78% or more. Preferred polypropylene copolymers also have an average propylene content on a molar basis of from about 97 percent or less. The balance of the copolymer is one or more linear or branched $\alpha$-olefins as specified above and optionally minor amounts of one or more diene monomers.

The semi-crystalline polypropylene copolymer typically has a heat of fusion of 5 J/g or more, preferably 9 J/g or more, more preferably 11 J/g or more. The semi-crystalline polypropylene copolymer typically has a heat of fusion of 90 J/g or less, preferably 76 J/g or less, more preferably 57 J/g or less. The crystallinity of the polypropylene copolymer arises from crystallizable stereoregular propylene sequences.

In another embodiment, the crystallinity of the polypropylene copolymer SPC is expressed in terms of crystallinity percent. The thermal energy for the highest order of polypropylene is estimated at 189 J/g. That is, 100% crystallinity is equal to 189 J/g. Therefore, according to the aforementioned energy levels, the present invention preferably has a minimum polypropylene crystallinity of 3% or more, more preferably 5% or more, even more preferably 6% or more, and a maximum polypropylene crystallinity of 48% or less, more preferably 30% or less, even more preferably 25% or less.

The polypropylene copolymer preferably has a single broad melting transition. Typically a sample of the polypropylene copolymer will show secondary melting peaks adjacent to the principal peak, these are considered together as single melting point. The highest of these peaks is considered the melting point. The polypropylene copolymer preferably has a melting point of from about 25° C. to about 110° C., preferably in the range of from about 30° C. to about 105° C., more preferably in the range of from about 35° C. to about 90° C.

The weight average molecular weight of the polypropylene copolymer can be between 10,000 to 5,000,000 g/cc, preferably 80,000 to 500,000 with a MWD ($M_w/M_n$) between 1.5 to 40.0, more preferably between about 1.8 to 5 and most preferably between 1.8 to 3. In another embodiment, it is preferred if the polypropylene copolymer has a Mooney viscosity ML (1+4)@125° C. less than 100, more preferably less than 75, even more preferably less than 60, most preferably less than 30.

The polypropylene copolymer of the present invention preferably comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt. % ethylene, or other $\alpha$-olefin, content) with a difference of no greater than 20% (relative) and more preferably 10% (relative) of the average weight % comonomer, such as ethylene or other $\alpha$-olefin, content of the polypropylene copolymer. The polypropylene copolymer has a narrow compositional distribution if it meets the fractionation test outlined above.

The length and distribution of stereoregular propylene sequences in preferred polypropylene copolymers is consistent with substantially random statistical copolymerization. It is well known that sequence length and distribution are related to the copolymerization reactivity ratios. By substantially random, we mean copolymer for which the product of the reactivity ratios is generally 2 or less. In stereoblock structures, the average length of PP sequences is greater than that of substantially random copolymers with a similar composition. Prior art polymers with stereoblock structure have a distribution of PP sequences consistent with these blocky structures rather than a random substantially statistical distribution. The reactivity ratios and sequence distribution of the polymer may be determined by C-13 NMR which locates the ethylene residues in relation to the neighboring propylene residues. To produce a crystallizable copolymer with the required randomness and narrow composition distribution, it is desirable to use a single-sited catalyst. In one embodiment, the single-sited catalyst is used in a well-mixed, continuous flow stirred tank polymerization reactor which allows only a single polymerization environment for substantially all of the polymer chains of preferred polypropylene copolymers.

Preferred polypropylene copolymers of this embodiment are prepared by polymerizing propylene and at least one $C_2$ or $C_4$–$C_{20}$ alpha olefin in the presence of a chiral metallocene catalyst with an activator and optional scavenger, most preferably ethylene and propylene. Preferred chiral metallocenes are those known to favor incorporation of propylene in predominantly isotactic polypropylene pentads and statistically random incorporation of the α-olefin or other olefinic comonomer(s). The term "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (referred to as activator) in order to yield an active metallocene catalyst which refers generally to an organometallic complex with a vacant coordination site that can coordinate, insert, and polymerize olefins.

Preferable metallocenes are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula:

$$(Cp^1R^1_m)R^3_n(Cp^2R^2_p)MX_q$$

Wherein $Cp^1$ of ligand $(Cp^1R^1_m)$ and $Cp^2$ of ligand $(Cp^2R^2_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to 20 carbon atoms, m is preferably 1 to 5, p is preferably 1 to 5, and preferably two $R^1$ and/or $R^2$ substituents on adjacent carbon atoms of the cyclopentadienyl ring associated there with can be joined together to form a ring containing from 4 to 20 carbon atoms, $R^3$ is a bridging group, n is the number of atoms in the direct chain between the two ligands and is preferably 1 to 8, most preferably 1 to 3, M is a transition metal having a valence of from 3 to 6, preferably from group IV, V, or VI of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, q is equal to the valence of M minus 2.

Numerous examples of the biscyclopentadienyl metallocenes described above for the invention are disclosed in U.S. Pat. No. 5,324,800; 5,198,401; 5,278,119, 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference for purposes of U.S. patent practice.

Illustrative, but not limiting examples of preferred biscyclopentadienyl metallocenes of the type described in group 1 above for the invention are the racemic isomers of:

$\mu$-$(CH_3)_2Si(indenyl)_2M(Cl)_2$ $\mu$-$(CH_3)_2Si(indenyl)_2M(CH_3)_2$ $\mu$-$(CH_3)_2Si(tetrahydroindenyl)_2M(Cl)_2$ $\mu$-$(CH_3)_2Si(tetrahydroindenyl)_2M(CH_3)_2$ $\mu$-$(CH_3)_2Si(indenyl)_2M(CH_2CH_3)_2$ $\mu$-$(C_6H_5)_2C(indenyl)_2M(CH_3)_2$;

Wherein M is chosen from a group consisting of Zr, Hf, or Ti.

A preferred polypropylene copolymer used in the present invention is described in detail as the "Second Polymer Component (SPC)" in co-pending U.S. applications U.S. Ser. No. 60/133,966, filed May 13, 1999, U.S. Ser. No. 60/342,854, filed Jun. 29, 1999, and U.S. Ser. No. 08/910, 001, filed Aug. 12, 1997 (now published as WO 99/07788), and described in further detail as the "Propylene Olefin Copolymer" in U.S. Ser. No. 90/346,460, filed Jul. 1, 1999, all of which are fully incorporated by reference herein for purposes of U. S. patent practice.

In addition to one or more comonomers (i.e., minor olefinic monomers) selected such as, but not limited to, ethylene, propylene, and α-olefins having 4 to 8 carbon atoms, and styrenes, the polyethylene and polypropylene copolymers, as described above can optionally contain long chain branches. These can optionally be generated using one or more α, ω dienes. Alternatively, the soft polymer component may contain small quantities of at least one diene, and more preferably at least one of the dienes is a non-conjugated diene to aid in the vulcanization and other chemical modification. The amount of diene is preferably no greater than about 10 wt %, more preferably no greater than about 5 wt %. The diene may be selected from the group consisting of those that are used for the vulcanization of ethylene propylene rubbers and preferably ethylidene norbomene, vinyl norbomene, dicyclopentadiene, and 1,4-hexadiene (available from DuPont Chemicals).

In another embodiment, the SPC can be a blend of discrete polymers. Such blends can be of two or more polyethylene copolymers (as described above), two or more polypropylene copolymers (as described above), or at least one of each such polyethylene copolymer and polypropylene copolymer, where each of the components of the SPC blend would individually qualify as a SPC.

In yet another embodiment, ethylene copolymers with vinyl acetate (EVA) and/or methyl acrylate (EMA) can be used as either an independent SPC or blend components within a blended SPC.

Hard Polymer Component

In one embodiment, a preferred hard polymer component is a polystyrene homopolymer, copolymer, or a combination thereof. The hard polymer component preferably has a flexural modulus of greater than 200 MPa, more preferably greater than 400 MPa, even more preferably greater than 800 MPa.

In another embodiment, a preferred hard polymer component is a polystyrene homopolymer, copolymer, or a combination thereof The hard polymer component preferably has a secant modulus of greater than 400 MPa, more preferably greater than 600 MPa, even more preferably greater than 800 MPa.

Polystyrene homopolymers or copolymers are typically formed from the addition polymerization of styrene and optionally one or more comonomers. Preferred polystyrene polymers to be used as a hard polymer component according to this invention should be at least 50 mole percent styrene, more preferably greater than 70 mole percent, even more preferably greater than 85 mole percent. Any copolymer of styrene and other monomers having vinylic or other polymerizable unsaturation can be used herein. Preferred comonomers include, but are not limited to, p-methylstyrene, acrylonitrile, methylmethacrylate, ethylacrylate, vinyltoluene, butadiene, and $C_2$–$C_{20}$ $\alpha$-olefins, especially ethylene.

In another embodiment, the HPC can be a blend of two or more polystyrene polymers (as described above), where each of the components of the HPC blend would individually qualify as a HPC.

In another embodiment, the HPC is one or more polymers selected from polyethylene homopolymer or ethylene-based copolymers wherein the homopolymers or copolymer have a density of 0.93 or more. Such homopolymers and copolymers are well known and are especially useful in blends with the propylene-based SPC described earlier and has a secant modulus of greater than 400 MPa, more preferably greater than 600 MPa, even more preferably greater than 800 MPa.

In yet another embodiment, the HPC is selected from but not limited to one or more of poly(methyl methacrylate), polyethylene terephthalate, polyamides, poly(vinyl cyclohexane), isotactic poly(4-methyl 1-pentene), poly (vinyl pyrolidone), isotactic polypropylene, syndiotactic polypropylene, and poly(2-vinyl pyridine).

Polymer Blend

With respect to the physical process of producing the blend, sufficient mixing should take place to assure that a uniform blend will be produced prior to conversion into a film. Mixing methods include simple solid state blends of the pellets or pelletized melt state blends of raw polymer granules, of granules with pellets, or of pellets of the two components since the extrusion process to form a film includes remelting and mixing of the raw material. In the process of compression molding, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy. Preferably, blends are prepared by melt mixing the components above the upper transition temperature of both components.

The blend components are selected based on the morphology desired for a given application. The SPC can be co-continuous with the HPC in the film formed from the blend, however, a dispersed HPC phase in a continuous SPC phase is preferred. The component selection is based on the immiscibility or incompatibility of the SPC and HPC (see D. R. Paul, S. Newman, *Polymer Blends*, Academic Press New York 1978). This assures a weak interface which can separate under uniaxial or biaxial stretching. Those skilled in the art can select the volume fractions of the two components to produce a dispersed HPC morphology in a continuous SPC matrix based on the viscosity ratio of the components (see S. Wu, *Polymer Engineering and Science*, Vol. 27, Page 335, 1987). The selection of immiscible components is critical to produce separation of the interface, as not every immisicble blend system fails at the interface under stretching.

Preferably, the SPC is blended with about 10 to 70 weight percent of the HPC, more preferably 15 to 60 weight percent, even more preferably 20 to 50 weight percent, based on the total weight of the two polymer components. Before cold-drawing the film preferably has a tensile modulus of less than 400 MPa, more preferably less than 300 MPa.

Preferred blends are free of or substantially free of a compatibilizing polymer composition, but such blends can contain typical amounts of other additives commonly used in film blends.

Film Production

The SPC/HPC blend of polymers may be formed into a film or a layer of a multi-layer film by methods well known in the art such as compression molding. Alternatively, the polymers may be extruded in a molten state above the transition temperature of both components through a flat die and then cooled. Alternatively, the polymers may be extruded in a molten state above the transition temperature of both components through an annular die and then blown and cooled to form a tubular film. The tubular film may be axially slit and unfolded to form a flat film. The films of the invention are cold-drawn, or plastically deformed either uniaxially or biaxially (i.e. substantially equally in both transverse and machine directions).

For purposes of this invention, "cold-drawn" means stretching the film, at a pre-selected temperature an effective amount to produce separation at the interface between the incompatible or immiscible HPC and SPC phases. The optimum combination of drawing dimensions and drawing temperature will vary according to the specific HPC and SPC and their relative amounts in the blend, but will generally follow the criteria set out below.

The preferred drawing temperature is dependent upon the components of the blend. First, the drawing temperature is preferably below the highest transition temperature of the HPC. Depending on the composition of the HPC, the highest transition temperature is either the glass transition temperature ($T_g$) or the crystalline melting temperature ($T_m$), if the material has a $T_m$. For polystyrene, the $T_g$ is the lowest transition and is recorded in the open literature as being in the range of about 100° C. to about 105° C. for a polystyrene homopolymer. Second, the drawing temperature is above the temperature at which crystalline melting can first be detected by DSC. For the polyethylene and polypropylene SPC's, as described above, the lowest temperature of crystalline melting is greater than 25° C., and probably greater than 30° C.

For an SPC of a single polymer, the most preferred drawing temperature will be between the temperature at which crystalline melting can first be detected and the temperature at which crystalline melting is substantially complete or can no longer be detected. In one embodiment, the film is allowed to reach an equilibrium temperature before drawing, and the drawing temperature is in the range of from $T_m$–20° C. to $T_m$+10° C., more preferably from $T_m$–10° C. to $T_m$+5° C. where $T_m$ is the crystalline melting peak temperature of the SPC. In another embodiment, the film is allowed to reach an equilibrium temperature before drawing, and the drawing temperature is in the range of from $T_m$−50° C. to $T_m$+10° C.

For an SPC formed from a blend of two or more polymers, this temperature range will widen since the polymer blend may have multiple melting peaks. In the case of such SPC blends, the upper transition temperature will control the upper limit for the stretching temperature. For example, as with a single polymer SPC, the film is allowed to reach an equilibrium temperature before drawing. In this case, the preferred drawing temperature is in the range of from $T_{m1}$−20° C. to $T_{m2}$+10° C., more preferably from $T_{m1}$−10° C. to $T_{m2}$+5° C. where $T_{m1}$ is the lowest crystalline melting peak temperature and $T_{m2}$ is the highest crystalline melting peak temperature of the blended SPC.

Preferred biaxial drawing dimensions range from about 200%×200% to about 850%×850%, more preferably about 300%×300% to about 800%×800%, even more preferably about 400%×400% to about 700%×700%. A hypothetical example for drawing 200%×200% means that a 10 cm×10 cm sample of a film would be stretched to a nominal 20 cm×20 cm. A minimum stretch, or draw, is identified by a visible change in the color of the film from semi-transparent toward white. Without limiting the scope of the invention, it is believed that whitening of the film is produced by scattering of light by voids in the film caused by separation at the interface between the incompatible HPC and SPC phases. These voids also combine to form circuitous paths through the film thickness thus making the film semi-permeable, or selectively permeable. A maximum stretch may be reached before the aforementioned limits in films from some non-optimum blends and/or stretched at non-optimum drawing temperatures at a lesser draw-down ratio.

After release of the stretching force, the films are allowed to retract. Preferable combinations of SPC/HPC blends, stretch dimensions, and stretch temperatures will result in films that retract to a permanently stretched deformation, relative to the film prior to stretching, of from about 150%×150% to about 850%×850%, more preferably about 250%×250% to about 800%×800%, even more preferably about 350%×350% to about 700%×700%.

Final Film Properties

In one embodiment, after cold-drawing the film preferably has a tensile modulus of less than 160 MPa, more preferably less than 100 MPa, even more preferably less than 80 MPa.

In another embodiment, after cold-drawing the film preferably has a tensile modulus of less than 375 MPa, more preferably less than 250 MPa, even more preferably less than 200 MPa.

Films according to this invention exhibit a higher water vapor transmission rate (WVTR) than would be expected based on the weighted average of the WVTR of each of the film blend components. Preferred films according to this invention exhibit a WVTR at least 100 gm-mil/$m^2$-day, more preferably at least 200 gm-mil/$m^2$-day, even more preferably at least 300 gm-mil/$m^2$-day, even preferably at least 500 gm-mil/$m^2$-day, most preferably at least 1000 gm-mil/$m^2$-day.

In another embodiment of the invention, breathable films also are substantially uniformly white in color relative to the hazy translucent films prior to stretching.

EXAMPLES

Test Methods

Melting point ($T_m$), glass transition temperature ($T_g$), heat of fusion ($\Delta H_f$), multiple melting peak, and any measurements related to detection of crystalline melting or crystallization are measured by Differential Scanning Calorimetry (DSC) or obtained from commonly accepted publications such as typical transition temperatures shown in Principle of Polymer Systems, Rodriguez, 2d ed., McGraw Hill Chemical Engineering Series, p. 38, Table 3-1. DSC was performed by a modified version of ASTM method D-3417. Preferably, about 6 mg to about 10 mg of a sheet of the preferred polymer pressed at approximately 200° C. to 230° C. is removed with a punch die and is aged at room temperature for at least 24 hours. At the end of this period, the sample is placed in a Differential Scanning Calorimeter and cooled to about −50° C. to −70° C. The sample is heated at about 10–20° C./minute to attain a final temperature of about 200° C. to about 220° C. The thermal output is recorded as the area under the melting peak, or peaks, of the sample which is typically at a maximum peak at about 30° C. to about 150° C. and occurs between the temperatures of about 0° C. and about 180° C. The thermal output is measured in Joules as a measure of the heat of melting. The melting point is recorded as the temperature of the greatest heat absorption within the range of melting temperature of the sample.

Tensile modulus was measured by ASTM method D-1708.

Flexural modulus was measured by ASTM method D-790.

Secant modulus was measured by ASTM method D-882.

Mooney viscosity was measured by ASTM method D-1646.

Melt Index (MI) was measured by ASTM method D-1238 (E).

Melt Flow Rate (MFR) was measured by ASTM method D-1238(L).

Weight and number average molecular weights ($M_w$ and $M_n$) were measured by gel permeation chromatography on a Waters 150 gel permeation chromatograph detector and a Chromatix KMX-6 on line light scattering photometer. The system is used at 135° C. with 1,2,4-trichlorobenzene as the mobile phase. Showdex (from Showa Denko America, Inc.) polystyrene gel columns 802, 803, 804 and 805 were used. This technique is discussed on "Liquid Chromotography of Polymers and Related Materials III" J. Cazes editor, Marcel Dekker, 1981, p. 207. No corrections for column spreading were employed. $M_m/M_n$ was calculated from elution times. The numerical analyses were performed using the commercially available Beckman/CIS LALLS software in conjunction with the standard Gel Permeation package.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128–1130. Different but similar methods are equally functional for this purpose and well known to those skilled in the art.

Comonomer content and sequence distribution of the SPC can be measured by carbon 13 nuclear magnetic resonance (C-13 NMR), and such method is well known to those skilled in the art.

Water Vapor Transmission Rate (WVTR) testing was performed in accordance with ASTM E-96-66(E) except that the temperature was changed from 38° C. to 30° C. and the relative humidity was changed from 90% to 100%. Another source for WVTR testing is *PDL Permeability and Other Film Properties of Plastics and Elastomers*, PDL Handbook Series, 1995.

Composition Distribution Breadth Index (CDBI), is defined as the weight percent of the copolymer molecules having a comonomer content within 50% (that is 50% on each side) of the median total molar comonomer content.

CDBI measurements can be made utilizing Temperature Rising Elution Fraction (TREF), as is now well known in the art. The technique is described by Wild et al. in the *Journal of Polymer Science*, Polymer Physics Edition, vol. 20, pg. 441 (1982), and in PCT Patent Application WO 93/03093, published Feb. 18, 1993.

Solubility Distribution Breadth Index (SDBI) is a means to measure the distribution of comonomer within a copolymer having components of varying molecular weights and MWD's as described in U.S. Pat. No. 5,008,204 and PCT published application WO 93103093.

All disclosures and specifications referred to in the above descriptions of testing procedures are fully incorporated herein by reference for purposes of U.S. patent practice.

Sample Preparation and Testing

Experiments were performed with the following blend components.

SPC1 is a polypropylene copolymer containing 12 weight percent ethylene as a comonomer with the balance of propylene having a Mooney viscosity ML (1+4)@125° C. of 13–14. The copolymer was produced using a chiral metallocene catalyst known to favor statistically random incorporation of the ethylene comonomer and propylene addition to produce isotactic runs. The copolymer is a thermoplastic elastomer and has a $T_m$ of about 65° C. from derived crystallinity resulting from isotactic polypropylene pentads. This copolymer was produced in accordance with the description of the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 09/346,460, filed Jul. 1, 1999.

SPC2 is a polypropylene copolymer containing 14 weight % ethylene. The copolymer was produced using a chiral metallocene catalyst as described above for SPC1. The copolymer is a thermoplastic elastomer and has a $T_m$ of about 50° C. from derived crystallinity resulting from isotactic polypropylene pentads.

SPC3 is a polyethylene copolymer sold as Exact™ 4033 polymer by ExxonMobil Chemical Company, Houston, Tex. This copolymer has a density of 0.880 g/cm$^3$, a MI of approximately 0.8 g/10 min., and a $T_m$ of about 60° C.

SPC4 is a polyethylene copolymer sold as Exact™ 4011 polymer by ExxonMobil Chemical Company, Houston, Tex. This copolymer has a density of 0.887, MI of 2.2 and a melting temperature of approximately 68 ° C.

HPC1 is polystyrene homopolymer with a MI of 7.5 g/10 min., available from Aldrich Chemical Company, Milwaukee, Wis.

HPC2 is HD7755 polyethylene polymer sold by ExxonMobil Chemical Company, Houston, Tex. This polymer has a density of 0.95 g/cm$^3$, a MI of approximately 0.055, and a $T_m$ of about 130° C.

HPC3 is HD6705 polyethylene polymer sold by ExxonMobil Chemical Company, Houston, Tex. This polymer has a density of 0.9525 g/cm$^3$, a MI of approximately 19, and a $T_m$ of about 127° C.

HPC4 is polyethylene polymer sold by ExxonMobil Chemical Company, Houston, Tex. This polymer has a density of 0.9525 g/cm$^3$, a MI of approximately 7, and a $T_m$ of about 129° C.

A1 is antioxidant Irganox™ IR 1076 available from Ciba-Geigy Corp., Greensboro, N.C.

Soft polymers and hard polymer selected from the above listing were blended in weight ratios as shown in Tables 1–6 and formed into pressed film for further testing and evaluation. Blend portions were approximately 40 grams each for a similarly sized mixer. Each blend was mixed in a Brabender mixer at 190° C. to 200° C. for 5 minutes with a mixing head speed of about 60 rpm. Each blend was then pressed into a film about 10 cm×10 cm×254 microns thick using a Carver press. Blended polymer portions were first placed on the press at contact pressure for a time, then held under load(s) for fixed time(s), and finally cooled for a time and under a different load. Specific times, pressures, and temperatures of the mixing and pressing processes are shown in Tables 1–6.

All films prepared in Tables 1–6 were aged for at least 2 weeks at ambient conditions (23° C. and atmospheric pressure) before stretching trials on a T M Long stretching machine. Samples of dimensions approximately 5 cm×5 cm were cut from the original films prior to stretching, or drawing. Observations of whitening of film was used as an indication of void formation, and therefore of breathability. Drawing dimensions, conditions and times, and performance of the drawn films are also shown in Tables 1–6.

TABLE 1

Film Preparation and Testing

| Example | 1 | 2 | 3 | 4 | 5 |
|---|---|---|---|---|---|
| SPC1 (wt. %) | — | — | — | — | — |
| SPC2 (wt. %) | — | — | — | | |
| SPC3 (wt. %) | 80 | 75 | 70 | 70 | 70 |
| HPC1 (wt. %) | 20 | 25 | 30 | 30 | 30 |
| HPC2 (wt. %) | — | — | — | — | — |
| HPC3 (wt. %) | — | — | — | — | — |
| A1 (wt. %) | 0.05 | 0.05 | 0.05 | 0.05 | 0.05 |
| Mixing Temperature (° C.) | 190 | 190 | 190 | 190 | 190 |
| Mixing Time (min.) | 5 | 5 | 5 | 5 | 5 |
| Press Temperature (° C.) | 180 | 180 | 180 | 180 | 180 |
| Time in Press @ Contact Pressure (min.) | 0.5 | 0.5 | 0.5 | 0.5 | 0.5 |
| Time in Press @ Load | 1.5 @ 1500, | 1.5 @ 1500, | 1.5 @ 1500, | 1.5 @ 1500, | 1.5 @ 1500, |

TABLE 1-continued

Film Preparation and Testing

| Example | 1 | 2 | 3 | 4 | 5 |
|---|---|---|---|---|---|
| (min. @ lbs.) | then 3 @ 15000 | then 3 @ 15000 | then 3 @ 15000 | then 3 @ 15000 | then 3 @ 15000 |
| Time on Chill Plates @ Load (min. @ lbs.) | 2 @ 5000 | 2 @ 5000 | 2 @ 5000 | 2 @ 5000 | 2 @ 5000 |
| Preheat Temperature, ° F. (° C.) | 130 (54) | 130 (54) | 130 (54) | 120 (49) | 140 (60) |
| Grip pressure (psi) | 450 | 450 | 450 | 450 | 450 |
| Stretching rate (in./sec) | 1 | 1 | 1 | 1 | 1 |
| Preheat time (sec) | 15 | 15 | 15 | 15 | 15 |
| Prestretch time (sec) | 5 | 5 | 5 | 5 | 5 |
| Stretch in both MD and TD (%) | 600 | 650 | 650 | 650 | 650 |
| Whitening | Yes | Yes | Yes | Yes | Yes |
| Elastic | Yes | Yes | Yes | Yes | Yes |
| WVTR (gm-mil/$m^2$-day) | 57 | 258 | 472 | 370 | 2063 |

NOTE: all wt. % based on SPC + HPC being 100%

SPC3 has an estimated WVTR of about 47 gM-mil/$m^2$ -day. HPC1 is substantially less permeable than SPC3. Therefore, any blend of SPC3 with HPC1 would be expected to have a lower WVTR value than either SPC3 alone. In contrast, Examples 1–5 in Table 1 show that all five blends have WVTR values greater than either SPC3 alone.

Examples 1–3 show that WVTR increases with the weight fraction of the HPC in the blend. However, maximum HPC content should be limited to maintain the HPC in the dispersed phase based on the viscosity ratio of the components.

Examples 3–5 show that WVTR increases with the temperature at which the stretching operation is performed. However, the maximum stretching temperature should be limited to prevent tearing of the film due to softening and/or melting of the continuous SPC component. This temperature will vary based on the particular selection of SPC and HPC blend components and their relative contents in the blend.

TABLE 2

Film Preparation and Testing

| Example | 6 | 7 | 8 | 9 | 10 | 11 |
|---|---|---|---|---|---|---|
| SPC1 (wt. %) | 80 | 75 | 70 | 60 | 50 | 40 |
| SPC2 (wt. %) | — | — | — | — | | |
| SPC3 (wt. %) | — | — | — | — | — | — |
| HPC1 (wt. %) | 20 | 25 | — | — | — | — |
| HPC2 (wt. %) | — | — | 30 | 40 | 50 | 60 |
| HPC3 (wt. %) | — | — | — | — | — | — |
| A1 (wt. %) | 0.05 | 0.05 | 0.05 | 0.05 | 0.05 | 0.05 |
| Mixing Temperature (° C.) | 190 | 190 | 190 | 190 | 190 | 190 |
| Mixing Time (min.) | 5 | 5 | 5 | 5 | 5 | 5 |
| Press Temperature (° C.) | 180 | 180 | 180 | 180 | 180 | 180 |
| Time in Press @ Contact Pressure (min.) | 0.5 | 0.5 | 0.5 | 0.5 | 0.5 | 0.5 |
| Time in Press @ Load (min. @ lbs.) | 1.5 @ 1500, then 3 @ 15000 | 1.5 @ 1500, then 3 @ 15000 | 1.5 @ 1500, then 3 @ 15000 | 1.5 @ 1500, then 3 @ 15000 | 1.5 @ 1500, then 3 @ 15000 | 1.5 @ 1500, then 3 @ 15000 |
| Time on Chill Plates @ Load (min. @ lbs.) | 2 @ 5000 | 2 @ 5000 | 2 @ 5000 | 2 @ 5000 | 2 @ 5000 | 2 @ 5000 |
| Preheat Temperature, ° F. (° C.) | 140 (60) | 150 (66) | 150 (66) | 150 (66) | 150 (66) | 165 (74) |
| Grip pressure (psi) | 300 | 300 | 300 | 300 | 300 | 300 |
| Stretching rate (in./sec) | 1 | 1 | 1 | 1 | 1 | 1 |
| Preheat time (sec) | 15 | 15 | 15 | 15 | 15 | 15 |
| Prestretch time (sec) | 5 | 5 | 5 | 5 | 5 | 5 |
| Stretch in both MD and TD (%) | 500 | 600 | 500 | 500 | 550 | 550 |
| Whitening | Yes | Yes | Yes | Yes | Yes | Yes |
| Elastic | Yes | Yes | Yes | Yes | Yes | Yes |
| WVTR (gm-mil/$m^2$-day) | 436 | 3756 | 98 | 55 | 27 | 1275 |

NOTE: all wt. % based on SPC + HPC being 100%

SPC1 has an estimated WVTR of less than about 65 gm-mil/$m^2$-day. HPC1 and HPC2 are each substantially less permeable than SPC1. Therefore, any blend of SPC1 with either HPC1 or HPC2 would be expected to have a lower WVTR value than SPC1 alone.

Examples 6–7 also show that WVTR increases with the weight fraction of the HPC in the blend. Again, however, maximum HPC content should be limited to maintain the HPC in the dispersed phage based on the viscosity ratio of the components.

Examples 8–11 show that WVTR eventually increases with the weight fraction of the HPC in the blend. However, these examples show an initial decrease in WVTR as HPC content is increased. Without intending to limit the scope of the invention or be limited by this theory, this is believed to be a result of an unfavorable blend morphology as a result of the high viscosity of the HPC relative to the SPC. Therefore, blends containing HPC's having a higher viscosity relative to the SPC (in the melt phase at a common temperature) should have a preferred range of HPC content in the HPC/SPC blend that is higher than the preferred HPC content for an HPC with a lower relative viscosity.

Examples 12–16 in Table 3 show that all five blends have WVTR values greater than the SPC alone.

Examples 12–13 further demonstrate that WVTR decreases when the relative (to the SPC) viscosity of the HPC increases, as discussed in Examples 8–11.

Examples 14–16 show that WVTR increases with the weight fraction of the HPC in the blend. However, maximum HPC content should be limited to maintain the HPC in the dispersed phase based on the viscosity ratio of the components, as discussed in Examples 1–3.

TABLE 3

| Film Preparation and Testing | | | | | |
|---|---|---|---|---|---|
| Example | 12 | 13 | 14 | 15 | 16 |
| SPC1 (wt. %) | — | — | — | — | — |
| SPC2 (wt. %) | 70 | 70 | — | — | — |
| SPC3 (wt. %) | — | — | 70 | 80 | 60 |
| HPC1 (wt. %) | — | — | 30 | 20 | 40 |
| HPC2 (wt. %) | — | 30 | — | — | — |
| HPC3 (wt. %) | 30 | — | — | — | — |
| A1 (wt. %) | 0.05 | 0.05 | 0.05 | 0.05 | 0.05 |
| Mixing Temperature (° C.) | 190 | 190 | 190 | 190 | 190 |
| Mixing Time (min.) | 5 | 5 | 5 | 5 | 5 |
| Press Temperature (° C.) | 180 | 180 | 180 | 180 | 180 |
| Time in Press @ Contact Pressure (min.) | 0.5 | 0.5 | 0.5 | 0.5 | 0.5 |
| Time in Press @ Load (min. @ lbs.) | 1.5 @ 1500, then 3 @ 15000 | 1.5 @ 1500, then 3 @ 15000 | 1.5 @ 1500, then 3 @ 15000 | 1.5 @ 1500, then 3 @ 15000 | 1.5 @ 1500, then 3 @ 15000 |
| Time on Chill Plates @ Load (min. @ lbs.) | 2 @ 5000 | 2 @ 5000 | 2 @ 5000 | 2 @ 5000 | 2 @ 5000 |
| Preheat Temperature, ° F. (° C.) | 100 (38) | 100 (38) | 120 (49) | 120 (49) | 200 (93) |
| Grip pressure (psi) | 400 | 300 | 400 | 400 | 400 |
| Stretching rate (in./sec) | 1 | 1 | 1 | 1 | 1 |
| Preheat time (sec) | 15 | 15 | 20 | 20 | 20 |
| Prestretch time (sec) | 5 | 5 | 5 | 5 | 5 |
| Stretch in both MD and TD (%) | 650 | 550 | 600 | 600 | 400 |
| Whitening | Yes | Yes | Yes | Yes | Yes |
| Elastic | Yes | Yes | Yes | Yes | Yes |
| WVTR (gm-mil/$m^2$-day) | 160 | 73 | >200 | >200 | >200 |

NOTE: all wt. % based on SPC + HPC being 100%

SPC2 and SPC3 have estimated WVTR values of 65 gm-mil/$m^2$-day and 47 gm-mil/$m^2$-day, respectively. HPC1, HPC2, and HPC3 are each substantially less permeable than SPC2 or SPC3. Therefore, any blend of SPC2 or SPC3 with any of HPC1, HPC2, or HPC3 would be expected to have a lower WVTR value than any of the SPC's alone. In contrast,

TABLE 4

| Film Preparation and Testing | | | | | | |
|---|---|---|---|---|---|---|
| Examples | 17 | 18 | 19 | 20 | 21 | 22 |
| SPC | SPC1 | SPC1 | SPC2 | SPC2 | SPC1 | SPC2 |
| HPC | HPC2 | HPC2 | HPC3 | HPC3 | HPC2 | HPC2 |
| Weight Fraction | 60:40 | 60:40 | 70:30 | 70:30 | 70:30 | 70:30 |
| Stretching Temperature F. (° C.) | 95 (35) | 145 (63) | 100 (38) | 150 (66) | 100 (38) | 100 (38) |
| Maximum Draw (%) | — | 400 | 600 | 150 | 300 | 550 |
| Stretchability | Poor | Good | Good | Poor | Poor | Good |
| Appearance | — | White | White | White | White | White |

Examples 17–22 were prepared and stretched in a T M Long machine substantially as described in Table 1. Varying the temperature of stretching in these examples showed that at low temperatures, stretchability was poor for SPC1, with film tearing almost immediately, but good for SPC2. SPC1 has a $T_m$ of approximately 65° C. SPC2 has a $T_m$ of approximately 50° C.

Examples 17 and 21, relative to Example 18, show that a stretch temperature too far below the melting temperature of the SPC yields poor stretchability. Example 20, relative to Examples 19 and 22, show that a stretch temperature too far above the melting temperature of the SPC yields poor stretchability.

TABLE 5

Film Preparation and Testing

| Example | 23 | 24 | 25 |
|---|---|---|---|
| SPC | SPC4 | SPC4 | SPC4 |
| HPC | HPC2 | HPC2 | HPC2 |
| Weight Fraction | 70:30 | 60:40 | 50:50 |
| Stretching Temperature F (° C.) | 145 (63) | 145 (63) | 145 (63) |
| Maximum Draw | 550 | 550 | 550 |
| Stretchability | Good | Good | Good |
| Appearance | Hazy | Hazy | Hazy |

Examples 23–25 were prepared and stretched in a T M Long machine substantially as described in Table 1. Examples 23–25 is an immiscible blend system that has a lower $\chi$SPC/HPC interaction parameter than those of the blends in Examples 1–22. No whitening was observed for any of the blends under draw conditions that resulted in good stretchable films. This suggests no or poor void formation, and therefore poor breathability.

TABLE 6

Film Preparation and Testing

| Examples | 26 | 27 |
|---|---|---|
| SPC | SPC1 | SPC1 |
| HPC | HPC4 | HPC2 |
| Volume Fraction | 70:30 | 70:30 |
| Stretching Temperature F (° C.) | 150 (66) | 150 (66) |
| Maximum Draw | 500 | 500 |
| Stretchability | Good | Good |
| Appearance | Hazy | White |

Examples 26 and 27 are included for completeness but Example 26 is believed to have errors in either the experimental procedure or the recording of such.

Therefore, the films of the present invention have high water vapor transmission rate that impart a wide variety of functionalities including water vapor permeability, chemical-vapor and/or liquid impermeability. Furthermore, such films can be attached to support layers to form laminates.

Without limiting the scope of the invention, it is believed that the functionality of this invention is related to the equilibrium interface mixing depth of one polymer with another which can be calculated from the Flory-Huggins $\chi_{AB}$ parameter for the two polymers A and B. (E. Helfand, *Accounts of Chemical Research* 8, 295 (1975)). The penetration depths for several polymer combinations have been tabulated. (E. Helfand and A. M. Sapse, *J Chem. Phys.* 62 (4), 1327 (1975)). In general, the thickness of the interface is a measure of compatibility, or in the case of this invention, incompatibility. Other preferred SPC/HPC blends to produce breathable films under this principle of incompatibility include: the polypropylene copolymer SPC described above with poly(vinyl pyrolidone) as the HPC; the polypropylene copolymer SPC described above with poly(2-vinyl pyridine) as the HPC; the polyethylene copolymer SPC described above with poly(vinyl pyrolidone) as the HPC; the polyethylene copolymer SPC described above with poly(2-vinyl pyridine) as the HPC; the polyethylene copolymer SPC described above with isotactic polypropylene as the HPC; EVA SPC with poly(4-methyl pentene-1) HPC; EVA SPC with polystyrene HPC; EVA SPC with poly(methyl methacrylate) (PMMA) HPC; EMA SPC with poly(4-methyl pentene-1) HPC; EMA SPC with polystyrene HPC; and EMA SPC with PMMA HPC.

Of course, it should be understood that a wide range of changes and modifications can be made to the embodiments described above. It is therefore intended that the foregoing description illustrates rather than limits this invention, and that it is the following claims, including all equivalents, which define this invention. For example, one skilled in the art would be familiar with the use of additives typically used in such films such as, but not limited to, dyes, pigments, fillers, waxes, plasticizers, anti-oxidants, heat stabilizers, light stabilizers, anti-block agents, processing aids, and combinations thereof, and further including fillers. Although it is known to use fillers in the production of breathable films, the films of this invention are breathable without the need for such fillers. However, it may be possible to optimize processing characteristics and breathability of a film for a specific application by adding a filler to the SPC/HPC blends of this invention.

For certain applications, films of the invention can be treated by exposure to a corona discharge or a plasma (oxygen, fluorine, nitrogen, etc.). For other applications, the film surface can be chemically modified with grafting or coupling agents or chemically oxidized in order to improve bonding and/or adhesion properties or alter, increase or decrease flux of liquid or gas.

What is claimed is:

1. A cold-drawn film comprising a blend of a) a semi-crystalline copolymer component of a major olefinic monomer and a minor olefinic monomer having a melting point greater than 25° C. and a flexural modulus less than 100 MPa, wherein said major olefinic monomer is ethylene or propylene and said minor olefinic monomer is different from said major olefinic monomer and is selected from the group consisting of linear, branched, or ring-containing $C_2$ to $C_{30}$ olefins, capable of insertion polymerization, and combinations thereof, and b) a polystyrene component having a flexural modulus greater than 200 MPa, wherein said copolymer is present in said film as a continuous phase and said film has a tensile modulus of less than 160 MPa.

2. The film of claim 1 wherein said major olefinic monomer is ethylene and is present in said copolymer in an amount greater than or equal to 84 mole % and less than or equal to 98 mole %.

3. The film of claim 2 wherein said copolymer has an MWD of from 1.5 to 4.0, and a narrow compositional distribution.

4. The film of claim 1 wherein said major olefinic monomer is propylene and is present in said copolymer in an amount greater than or equal to 49 mole % and less than or equal to 90 mole %.

5. The film of claim 4 wherein said copolymer contains from 5 to 40 weight % crystallinity.

6. The film of claim 1 wherein said minor olefinic monomer is one or more selected from selected from ethylene and a α-olefins.

7. The film of claim 6 wherein said minor α-olefin is selected from the group consisting of ethylene, propylene, 1-butene, 1-hexene, 4-methyl-1-pentene, 3-methyl-1-pentene, 3,5,5-trimethyl-1-hexene, and 1-octene.

8. The film of claim 1 comprising from 30 to 90 weight percent of said copolymer component and from 70 to 10 weight percent of said polystyrene component based on the total weight of the blend components.

9. The film of claim 1 further comprising one or more additives selected from the group consisting of dyes, pigments, fillers, waxes, plasticizers, anti-oxidants, heat stabilizers, light stabilizers, anti-block agents, processing aids, and combinations thereof.

10. The film of claim 1 wherein said film is substantially free of filler and has a water vapor transmission rate greater than either of the components alone.

11. A cold-drawn film comprising a blend of a) a first polymer component selected from
  i) one or more thermoplastic copolymers each comprising between 49 and 90 mole % propylene and at least one of ethylene or a $C_4$ to $C_{20}$ α-olefin, said thermoplastic copolymer having a melting point of 25° C. or more, an MWD of from 1.5 to 4.0, crystallinity of from 5 to 40 weight %, and a flexural modulus less than 100 MPa,
  ii) one or more thermoplastic copolymers each comprising between 84 and 98 mole % ethylene and at least one $C_3$ to $C_{20}$ α-olefin, said thermoplastic copolymer having a melting point of 25° C. or more, an MWD of from 1.5 to 4.0, a narrow compositional distribution, and a flexural modulus less than 100 Mpa, and
  iii) blends of i) and ii), and b) a polystyrene component having a flexural modulus greater than 200 MPa, wherein said film has a tensile modulus of less than 160 MPa and a water vapor transmission rate of at least 100 gm-mil/$m^2$-day.

12. The film of claim 11 wherein said film is substantially free of filler.

13. A method for producing a film, formed from a blend of two incompatible polymer components, said film having a higher WVTR than a film from either of said polymer components, said method comprising the steps of a) forming a film from a blend of a semi-crystalline first polymer component with a second polymer component in amounts and at conditions sufficient to produce a blend wherein said first polymer component is a continuous phase, and b) drawing said film at a temperature sufficient to cause less than 100% melting of the crystallinity of said soft polymer component to a stretched dimension sufficient to produce separation of at least a portion of the interface between said first and second polymers, wherein said first polymer component is selected from
  i) one or more thermoplastic copolymers each comprising between 49 and 90 mole % propylene and at least one $C_2$ to $C_{30}$ olefinic monomer other than propylene, capable of insertion polymerization, said thermoplastic copolymer having a melting point of 25° C. or more, an MWD of from 1.5 to 4.0, crystallinity of from 5 to 40 weight %, and a flexural modulus less than 100 MPa,
  ii) one or more thermoplastic copolymers each comprising between 84 and 98 mole % ethylene and at least one $C_3$ to $C_{30}$ olefinic monomer, capable of insertion polymerization, said thermoplastic copolymer having a melting point of 25° C. or more, an MWD of from 1.5 to 4.0, a narrow compositional distribution, and a flexural modulus less than 100 Mpa, and
  iii) blends of i) and ii), and said second polymer component is a polystyrene polymer having a flexural modulus greater than 200 MPa.

14. The method of claim 13 wherein said olefinic monomer is one or more selected from ethylene and α-olefins.

15. A cold-drawn film comprising a blend of a) a semi-crystalline copolymer component of a major olefinic monomer and a minor olefinic monomer having a melting point greater than 25° C. and a flexural modulus less than 100 MPa, wherein said major olefinic monomer is propylene and said minor olefinic monomer is one or more selected from ethylene and $C_4$ to $C_{20}$ alpha olefins capable of insertion polymerization, and combinations thereof, and b) a polyethylene homopolymer or copolymer component having a density of 0.93 or more and a flexural modulus greater than 200 MPa, wherein said semi-crystalline copolymer is present in said film as a continuous phase and said film has a tensile modulus of less than 160 MPa.

16. The film of claim 15 wherein said semi-crystalline copolymer has an MWD of from 1.5 to 4.0, and a narrow compositional distribution.

17. The film of claim 15 wherein said major olefinic monomer is present in said semi-crystalline copolymer in an amount greater than or equal to 49 mole % and less than or equal to 90 mole %.

18. The film of claim 15 wherein said semi-crystalline copolymer contains from 5 to 40 weight % crystallinity.

19. The film of claim 15 wherein said minor olefinic monomer is ethylene.

20. The film of claim 15 comprising from 30 to 90 weight percent of said copolymer component and from 70 to 10 weight percent of said polyethylene component based on the total weight of the blend components.

21. The film of claim 15 further comprising one or more additives selected from the group consisting of dyes, pigments, fillers, waxes, plasticizers, anti-oxidants, heat stabilizers, light stabilizers, anti-block agents, processing aids, and combinations thereof.

22. The film of claim 15 wherein said film is substantially free of filler and has a water vapor transmission rate greater than a film from either of the components alone.

23. A cold-drawn film comprising a blend of a) a semi-crystalline copolymer component of a major olefinic monomer and a minor olefinic monomer having a melting point greater than 25° C. and a secant modulus less than 350 MPa, wherein said major olefinic monomer is ethylene or propylene and said minor olefinic monomer is different from said major olefinic monomer and is selected from the group consisting of linear, branched, or ring-containing $C_2$ to $C_{30}$ olefins, capable of insertion polymerization, and combinations thereof, and b) a polystyrene component having a flexural modulus greater than 400 MPa, wherein said copolymer is present in said film as a continuous phase and said film has a tensile modulus of less than 375 MPa.

24. The film of claim 23 wherein said major olefinic monomer is ethylene and is present in said copolymer in an amount greater than or equal to 84 mole % and less than or equal to 98 mole %.

25. The film of claim 23 wherein said copolymer has an MWD of from 1.5 to 4.0, and a narrow compositional distribution.

26. The film of claim 23 comprising from 30 to 90 weight percent of said copolymer component and from 70 to 10 weight percent of said polystyrene component based on the total weight of the blend components.

27. The film of claim 23 further comprising additives selected from the group consisting of dyes, pigments, fillers, waxes, plasticizers, anti-oxidants, heat stabilizers, light stabilizers, anti-block agents, processing aids, and combinations thereof.

28. The film of claim 23 wherein said film is substantially free of filler and has a water vapor transmission rate greater than a film from either of the components alone.

* * * * *